US012754633B1

(12) United States Patent
Portmann et al.

(10) Patent No.: US 12,754,633 B1
(45) Date of Patent: Oct. 6, 2026

(54) REDUCTION OF RADIATED EMISSION FROM TOUCHSCREEN

(71) Applicant: Microchip Touch Solutions Limited, Wokingham (GB)

(72) Inventors: Lionel Portmann, Vaud (CH); Richard P. Collins, Southampton (GB); John Dubery, Basingstoke (GB)

(73) Assignee: Microchip Touch Solutions Limited, Wokingham (GB)

( * ) Notice: Subject to any disclaimer, the term of this patent is extended or adjusted under 35 U.S.C. 154(b) by 0 days.

(21) Appl. No.: 19/320,070

(22) Filed: Sep. 5, 2025

Related U.S. Application Data

(60) Provisional application No. 63/794,753, filed on Apr. 25, 2025.

(51) Int. Cl.
*G06F 3/041* (2006.01)
*G06F 3/044* (2006.01)

(52) U.S. Cl.
CPC ...... *G06F 3/04166* (2019.05); *G06F 3/04162* (2019.05); *G06F 3/0446* (2019.05)

(58) Field of Classification Search
None
See application file for complete search history.

(56) References Cited

U.S. PATENT DOCUMENTS

| | | | | |
|---|---|---|---|---|
| 2012/0013546 | A1 | 1/2012 | Westhues et al. | 345/173 |
| 2020/0300900 | A1 | 9/2020 | Bolender | |
| 2023/0100570 | A1 * | 3/2023 | Sadeghipour | G06F 3/0418 |

OTHER PUBLICATIONS

International Search Report and Written Opinion, Application No. PCT/EP2025/080370, 13 pages, Apr. 17, 2026.

* cited by examiner

*Primary Examiner* — Nicholas J Lee
(74) *Attorney, Agent, or Firm* — SLAYDEN GRUBERT BEARD PLLC

(57) ABSTRACT

Radiation emission of a capacitive sensing system may be reduced. The amplitude of the residual emission per chip may be reduced by reassigning CDMA codes to TX electrodes. The skirt of the emitted spectrum of the residual emission may be reduced by ordering the chips by their absolute amplitude and scheduling their appearance so that chips at the beginning and end of the scan have the lowest amplitude, while those in the middle have the highest amplitude. The residual emission may be reduced by modifying chip polarity by inverting the polarity of all transmit signals applied to the X electrodes during a chip.

20 Claims, 18 Drawing Sheets

IDEAL TRANSMISSION

| | | | | | | | |
|---|---|---|---|---|---|---|---|
| $tx_1$ | 1 | 1 | 1 | 1 | 1 | 1 | 1 |
| $tx_2$ | -1 | 1 | -1 | -1 | 1 | 1 | -1 |
| $tx_3$ | 1 | -1 | 1 | -1 | -1 | 1 | -1 |
| $tx_4$ | -1 | -1 | -1 | 1 | -1 | 1 | 1 |
| $tx_5$ | 1 | 1 | -1 | -1 | -1 | -1 | 1 |
| $tx_6$ | -1 | 1 | 1 | 1 | -1 | -1 | -1 |
| $tx_7$ | 1 | -1 | -1 | 1 | 1 | -1 | -1 |
| $tx_8$ | -1 | -1 | 1 | -1 | 1 | -1 | 1 |
| TOTAL | **0.0** | **0.0** | **0.0** | **0.0** | **0.0** | **0.0** | **0.0** |

| EMISSION PER ELECTRODE | ACTUAL TRANSMISSION | | | | | | |
|---|---|---|---|---|---|---|---|
| **1.40** | 1.40 | 1.40 | 1.40 | 1.40 | 1.40 | 1.40 | 1.40 |
| **1.20** | -1.20 | 1.20 | -1.20 | -1.20 | 1.20 | 1.20 | -1.20 |
| **1.16** | 1.16 | -1.16 | 1.16 | -1.16 | -1.16 | 1.16 | -1.16 |
| **1.12** | -1.12 | -1.12 | -1.12 | 1.12 | -1.12 | 1.12 | 1.12 |
| **1.08** | 1.08 | 1.08 | -1.08 | -1.08 | -1.08 | -1.08 | 1.08 |
| **1.04** | -1.04 | 1.04 | 1.04 | 1.04 | -1.04 | -1.04 | -1.04 |
| **1.00** | 1.00 | -1.00 | -1.00 | 1.00 | 1.00 | -1.00 | -1.00 |
| **1.10** | -1.10 | -1.10 | 1.10 | -1.10 | 1.10 | -1.10 | 1.10 |
| | **0.18** | **0.34** | **0.30** | **0.02** | **0.30** | **0.66** | **0.30** |

ORIGINAL CDM CODE ASSIGNMENTS

| | $CHIP_1$ | $CHIP_2$ | $CHIP_3$ | $CHIP_4$ | $CHIP_5$ | $CHIP_6$ | $CHIP_7$ |
|---|---|---|---|---|---|---|---|
| | 1 | 1 | 1 | 1 | 1 | 1 | 1 |
| | -1 | 1 | -1 | -1 | 1 | 1 | -1 |
| | 1 | -1 | 1 | -1 | -1 | 1 | -1 |
| | -1 | -1 | -1 | 1 | -1 | 1 | 1 |
| | 1 | 1 | -1 | -1 | -1 | -1 | 1 |
| | -1 | 1 | 1 | 1 | -1 | -1 | -1 |
| | 1 | -1 | -1 | 1 | 1 | -1 | -1 |
| | -1 | -1 | 1 | -1 | 1 | -1 | 1 |
| $Tx_0$ | 1.40 | 1.40 | 1.40 | 1.40 | 1.40 | 1.40 | 1.40 |
| $Tx_1$ | -1.20 | 1.20 | -1.20 | -1.20 | 1.20 | 1.20 | -1.20 |
| $Tx_2$ | 1.16 | -1.16 | 1.16 | -1.16 | -1.16 | 1.16 | -1.16 |
| $Tx_3$ | -1.12 | -1.12 | -1.12 | 1.12 | -1.12 | 1.12 | 1.12 |
| $Tx_4$ | 1.08 | 1.08 | -1.08 | -1.08 | -1.08 | -1.08 | 1.08 |
| $Tx_5$ | -1.04 | 1.04 | 1.04 | 1.04 | -1.04 | -1.04 | -1.04 |
| $Tx_6$ | 1.00 | -1.00 | -1.00 | 1.00 | 1.00 | -1.00 | -1.00 |
| $Tx_7$ | -1.10 | -1.10 | 1.10 | -1.10 | 1.10 | -1.10 | 1.10 |
| | **0.18** | **0.34** | **0.30** | **0.02** | **0.30** | **0.66** | **0.30** |

CDM CODE REASSIGNMENTS

| $CHIP_1$ | $CHIP_2$ | $CHIP_3$ | $CHIP_4$ | $CHIP_5$ | $CHIP_6$ | $CHIP_7$ |
|---|---|---|---|---|---|---|
| -1 | -1 | 1 | -1 | 1 | -1 | 1 |
| 1 | -1 | -1 | 1 | 1 | -1 | -1 |
| -1 | 1 | 1 | 1 | -1 | -1 | -1 |
| -1 | -1 | -1 | 1 | -1 | 1 | 1 |
| -1 | 1 | -1 | -1 | 1 | 1 | -1 |
| 1 | -1 | 1 | -1 | -1 | 1 | -1 |
| 1 | 1 | -1 | -1 | -1 | -1 | 1 |
| 1 | 1 | 1 | 1 | 1 | 1 | 1 |
| -1.40 | -1.40 | 1.40 | -1.40 | 1.40 | -1.40 | 1.40 |
| 1.20 | -1.20 | -1.20 | 1.20 | 1.20 | -1.20 | -1.20 |
| -1.16 | 1.16 | 1.16 | 1.16 | -1.16 | -1.16 | -1.16 |
| -1.12 | -1.12 | -1.12 | 1.12 | -1.12 | 1.12 | 1.12 |
| -1.08 | 1.08 | -1.08 | -1.08 | 1.08 | 1.08 | -1.08 |
| 1.04 | -1.04 | 1.04 | -1.04 | -1.04 | 1.04 | -1.04 |
| 1.00 | 1.00 | -1.00 | -1.00 | -1.00 | -1.00 | 1.00 |
| 1.10 | 1.10 | 1.10 | 1.10 | 1.10 | 1.10 | 1.10 |
| **-0.42** | **-0.42** | **0.30** | **0.06** | **0.46** | **-0.42** | **0.14** |

| CHIP$_1$ | CHIP$_2$ | CHIP$_3$ | CHIP$_4$ | CHIP$_5$ | CHIP$_6$ | CHIP$_7$ |
|---|---|---|---|---|---|---|
| -1 | -1 | 1 | -1 | 1 | -1 | 1 |
| 1 | -1 | -1 | 1 | 1 | -1 | -1 |
| -1 | 1 | 1 | 1 | -1 | -1 | -1 |
| -1 | -1 | -1 | 1 | -1 | 1 | 1 |
| -1 | 1 | -1 | -1 | 1 | 1 | -1 |
| 1 | -1 | 1 | -1 | -1 | 1 | -1 |
| 1 | 1 | -1 | -1 | -1 | -1 | 1 |
| 1 | 1 | 1 | 1 | 1 | 1 | 1 |

| | | | | | | |
|---|---|---|---|---|---|---|
| -1.40 | -1.40 | 1.40 | -1.40 | 1.40 | -1.40 | 1.40 |
| 1.20 | -1.20 | -1.20 | 1.20 | 1.20 | -1.20 | -1.20 |
| -1.16 | 1.16 | 1.16 | 1.16 | -1.16 | -1.16 | -1.16 |
| -1.12 | -1.12 | -1.12 | 1.12 | -1.12 | 1.12 | 1.12 |
| -1.08 | 1.08 | -1.08 | -1.08 | 1.08 | 1.08 | -1.08 |
| 1.04 | -1.04 | 1.04 | -1.04 | -1.04 | 1.04 | -1.04 |
| 1.00 | 1.00 | -1.00 | -1.00 | -1.00 | -1.00 | 1.00 |
| 1.10 | 1.10 | 1.10 | 1.10 | 1.10 | 1.10 | 1.10 |
| **-0.42** | **-0.42** | **0.30** | **0.06** | **0.46** | **-0.42** | **0.14** |

REORDER CHIPS

| CHIP$_4$ | CHIP$_3$ | CHIP$_2$ | CHIP$_5$ | CHIP$_6$ | CHIP$_1$ | CHIP$_7$ |
|---|---|---|---|---|---|---|
| -1 | 1 | -1 | 1 | -1 | -1 | 1 |
| 1 | -1 | -1 | 1 | -1 | 1 | -1 |
| 1 | 1 | 1 | -1 | -1 | -1 | -1 |
| 1 | -1 | -1 | -1 | 1 | -1 | 1 |
| -1 | -1 | 1 | 1 | 1 | -1 | -1 |
| -1 | 1 | -1 | -1 | 1 | 1 | -1 |
| -1 | -1 | 1 | -1 | -1 | 1 | 1 |
| 1 | 1 | 1 | 1 | 1 | 1 | 1 |

| | | | | | | |
|---|---|---|---|---|---|---|
| -1.40 | 1.40 | -1.40 | 1.40 | -1.40 | -1.40 | 1.40 |
| 1.20 | -1.20 | -1.20 | 1.20 | -1.20 | 1.20 | -1.20 |
| 1.16 | 1.16 | 1.16 | -1.16 | -1.16 | -1.16 | -1.16 |
| 1.12 | -1.12 | -1.12 | -1.12 | 1.12 | -1.12 | 1.12 |
| -1.08 | -1.08 | 1.08 | 1.08 | 1.08 | -1.08 | -1.08 |
| -1.04 | 1.04 | -1.04 | -1.04 | 1.04 | 1.04 | -1.04 |
| -1.00 | -1.00 | 1.00 | -1.00 | -1.00 | 1.00 | 1.00 |
| 1.10 | 1.10 | 1.10 | 1.10 | 1.10 | 1.10 | 1.10 |
| **0.06** | **0.30** | **-0.42** | **0.46** | **-0.42** | **-0.42** | **0.14** |

| CHIP$_1$ | CHIP$_2$ | CHIP$_3$ | CHIP$_4$ | CHIP$_5$ | CHIP$_6$ | CHIP$_7$ |
|---|---|---|---|---|---|---|
| -1 | 1 | -1 | 1 | -1 | -1 | 1 |
| 1 | -1 | -1 | 1 | -1 | 1 | -1 |
| 1 | 1 | 1 | -1 | -1 | -1 | -1 |
| 1 | -1 | -1 | -1 | 1 | -1 | 1 |
| -1 | -1 | 1 | 1 | 1 | -1 | -1 |
| -1 | 1 | -1 | -1 | 1 | 1 | -1 |
| -1 | -1 | 1 | -1 | -1 | 1 | 1 |
| 1 | 1 | 1 | 1 | 1 | 1 | 1 |

MODULATE POLARITIES

| CHIP$_1$ | CHIP$_2$ | CHIP$_3$ | CHIP$_4$ | CHIP$_5$ | CHIP$_6$ | CHIP$_7$ |
|---|---|---|---|---|---|---|
| 1 | 1 | -1 | 1 | -1 | 1 | -1 |
| -1 | -1 | -1 | 1 | -1 | -1 | 1 |
| -1 | 1 | 1 | -1 | -1 | 1 | 1 |
| -1 | -1 | -1 | -1 | 1 | 1 | -1 |
| 1 | -1 | 1 | 1 | 1 | 1 | 1 |
| 1 | 1 | -1 | -1 | 1 | -1 | 1 |
| 1 | -1 | 1 | -1 | -1 | -1 | -1 |
| -1 | 1 | 1 | 1 | 1 | -1 | -1 |
| -1 | | | | | -1 | -1 |

| | | | | | | |
|---|---|---|---|---|---|---|
| -1.40 | 1.40 | -1.40 | 1.40 | -1.40 | -1.40 | 1.40 |
| 1.20 | -1.20 | -1.20 | 1.20 | -1.20 | 1.20 | -1.20 |
| 1.16 | 1.16 | 1.16 | -1.16 | -1.16 | -1.16 | -1.16 |
| 1.12 | -1.12 | -1.12 | -1.12 | 1.12 | -1.12 | 1.12 |
| -1.08 | -1.08 | 1.08 | 1.08 | 1.08 | -1.08 | -1.08 |
| -1.04 | 1.04 | -1.04 | -1.04 | 1.04 | 1.04 | -1.04 |
| -1.00 | -1.00 | 1.00 | -1.00 | -1.00 | 1.00 | 1.00 |
| 1.10 | 1.10 | 1.10 | 1.10 | 1.10 | 1.10 | 1.10 |
| **0.06** | **0.30** | **-0.42** | **0.46** | **-0.42** | **-0.42** | **0.14** |

| | | | | | | |
|---|---|---|---|---|---|---|
| 1.40 | 1.40 | -1.40 | 1.40 | -1.40 | 1.40 | -1.40 |
| -1.20 | -1.20 | -1.20 | 1.20 | -1.20 | -1.20 | 1.20 |
| -1.16 | 1.16 | 1.16 | -1.16 | -1.16 | 1.16 | 1.16 |
| -1.12 | -1.12 | -1.12 | -1.12 | 1.12 | 1.12 | -1.12 |
| 1.08 | -1.08 | 1.08 | 1.08 | 1.08 | 1.08 | 1.08 |
| 1.04 | 1.04 | -1.04 | -1.04 | 1.04 | -1.04 | 1.04 |
| 1.00 | -1.00 | 1.00 | -1.00 | -1.00 | -1.00 | -1.00 |
| -1.10 | 1.10 | 1.10 | 1.10 | 1.10 | -1.10 | -1.10 |
| **-0.06** | **0.30** | **-0.42** | **0.46** | **-0.42** | **-0.42** | **-0.14** |
| **NEG** | **POS** | **NEG** | **POS** | **NEG** | **POS** | **NEG** |

| | | | | | | |
|---|---|---|---|---|---|---|
| 1 | 1 | 1 | 1 | 1 | 1 | 1 |
| -1 | 1 | -1 | -1 | 1 | 1 | -1 |
| 1 | -1 | 1 | -1 | -1 | 1 | -1 |
| -1 | -1 | -1 | 1 | -1 | 1 | 1 |
| 1 | 1 | -1 | -1 | -1 | -1 | 1 |
| -1 | 1 | 1 | 1 | -1 | -1 | -1 |
| 1 | -1 | -1 | 1 | 1 | -1 | -1 |
| -1 | -1 | 1 | -1 | 1 | -1 | 1 |

| | | | | | | |
|---|---|---|---|---|---|---|
| 1.40 | 1.40 | 1.40 | 1.40 | 1.40 | 1.40 | 1.40 |
| -1.20 | 1.20 | -1.20 | -1.20 | 1.20 | 1.20 | -1.20 |
| 1.16 | -1.16 | 1.16 | -1.16 | -1.16 | 1.16 | -1.16 |
| -1.12 | -1.12 | -1.12 | 1.12 | -1.12 | 1.12 | 1.12 |
| 1.08 | 1.08 | -1.08 | -1.08 | -1.08 | -1.08 | 1.08 |
| -1.04 | 1.04 | 1.04 | 1.04 | -1.04 | -1.04 | -1.04 |
| 1.00 | -1.00 | -1.00 | 1.00 | 1.00 | -1.00 | -1.00 |
| -1.10 | -1.10 | 1.10 | -1.10 | 1.10 | -1.10 | 1.10 |
| **0.18** | **0.34** | **0.30** | **0.02** | **0.30** | **0.66** | **0.30** |

| | | | | | | |
|---|---|---|---|---|---|---|
| -1.40 | -1.40 | 1.40 | -1.40 | 1.40 | -1.40 | 1.40 |
| 1.20 | -1.20 | -1.20 | 1.20 | 1.20 | -1.20 | -1.20 |
| -1.16 | 1.16 | 1.16 | 1.16 | -1.16 | -1.16 | -1.16 |
| -1.12 | -1.12 | -1.12 | 1.12 | -1.12 | 1.12 | 1.12 |
| -1.08 | 1.08 | -1.08 | -1.08 | 1.08 | 1.08 | -1.08 |
| 1.04 | -1.04 | 1.04 | -1.04 | -1.04 | 1.04 | -1.04 |
| 1.00 | 1.00 | -1.00 | -1.00 | -1.00 | -1.00 | 1.00 |
| 1.10 | 1.10 | 1.10 | 1.10 | 1.10 | 1.10 | 1.10 |
| **-0.42** | **-0.42** | **0.30** | **0.06** | **0.46** | **-0.42** | **0.14** |

| | | | | | | |
|---|---|---|---|---|---|---|
| -1 | 1 | -1 | 1 | -1 | -1 | 1 |
| 1 | -1 | -1 | 1 | -1 | 1 | -1 |
| 1 | 1 | 1 | -1 | -1 | -1 | -1 |
| 1 | -1 | -1 | -1 | 1 | -1 | 1 |
| -1 | -1 | 1 | 1 | 1 | -1 | -1 |
| -1 | 1 | -1 | -1 | 1 | 1 | -1 |
| -1 | -1 | 1 | -1 | -1 | 1 | 1 |
| 1 | 1 | 1 | 1 | 1 | 1 | 1 |

| | | | | | | |
|---|---|---|---|---|---|---|
| -1.40 | 1.40 | -1.40 | 1.40 | -1.40 | -1.40 | 1.40 |
| 1.20 | -1.20 | -1.20 | 1.20 | -1.20 | 1.20 | -1.20 |
| 1.16 | 1.16 | 1.16 | -1.16 | -1.16 | -1.16 | -1.16 |
| 1.12 | -1.12 | -1.12 | -1.12 | 1.12 | -1.12 | 1.12 |
| -1.08 | -1.08 | 1.08 | 1.08 | 1.08 | -1.08 | -1.08 |
| -1.04 | 1.04 | -1.04 | -1.04 | 1.04 | 1.04 | -1.04 |
| -1.00 | -1.00 | 1.00 | -1.00 | -1.00 | 1.00 | 1.00 |
| 1.10 | 1.10 | 1.10 | 1.10 | 1.10 | 1.10 | 1.10 |
| **0.06** | **0.30** | **-0.42** | **0.46** | **-0.42** | **-0.42** | **0.14** |

| | | | | | | |
|---|---|---|---|---|---|---|
| 1 | 1 | -1 | 1 | -1 | 1 | -1 |
| -1 | -1 | -1 | 1 | -1 | -1 | 1 |
| -1 | 1 | 1 | -1 | -1 | 1 | 1 |
| -1 | -1 | -1 | -1 | 1 | 1 | -1 |
| 1 | -1 | 1 | 1 | 1 | 1 | 1 |
| 1 | 1 | -1 | -1 | 1 | -1 | 1 |
| 1 | -1 | 1 | -1 | -1 | -1 | -1 |
| -1 | 1 | 1 | 1 | 1 | -1 | -1 |
| -1 | | | | | -1 | -1 |

FROM FIG. 10C

| | | | | | | |
|---|---|---|---|---|---|---|
| 1.40 | 1.40 | -1.40 | 1.40 | -1.40 | 1.40 | -1.40 |
| -1.20 | -1.20 | -1.20 | 1.20 | -1.20 | -1.20 | 1.20 |
| -1.16 | 1.16 | 1.16 | -1.16 | -1.16 | 1.16 | 1.16 |
| -1.12 | -1.12 | -1.12 | -1.12 | 1.12 | 1.12 | -1.12 |
| 1.08 | -1.08 | 1.08 | 1.08 | 1.08 | 1.08 | 1.08 |
| 1.04 | 1.04 | -1.04 | -1.04 | 1.04 | -1.04 | 1.04 |
| 1.00 | -1.00 | 1.00 | -1.00 | -1.00 | -1.00 | -1.00 |
| -1.10 | 1.10 | 1.10 | 1.10 | 1.10 | -1.10 | -1.10 |
| **-0.06** | **0.30** | **-0.42** | **0.46** | **-0.42** | **-0.42** | **-0.14** |
| **NEG** | **POS** | **NEG** | **POS** | **NEG** | **POS** | **NEG** |

REDUCTION OF RADIATED EMISSION FROM TOUCHSCREEN

RELATED PATENT APPLICATION

This application claims priority to commonly owned U.S. Provisional Patent Application No. 63/794,753 filed Apr. 25, 2025, the entire contents of which are hereby incorporated by reference for all purposes.

TECHNICAL FIELD

The present application relates to touch sensors, and more particularly to touchscreens with low radiated emissions.

BACKGROUND

A two-dimensional touchscreen has electrodes that function as transmitters (X) or receivers (Y), arranged in rows and columns to form a matrix of mutual capacitance intersections or nodes. The transmitter (X) electrodes are activated with periodic stimulus signals for a specific duration, each referred to as a "chip," to measure the capacitive coupling between the X and Y electrodes. To distinctly identify the contribution of each intersection or node, a scan comprising multiple chips is applied, with each chip having a unique mapping of stimulus signals to specific transmitter (X) electrodes. Various mapping techniques are available, such as time division multiplexed access (TDMA) or code division multiplexed access (CDMA). CDMA mappings utilize multiple polarities of stimulus signals, both positive and negative in the simplest form.

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household, automotive, or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch sensor controller may process the change in capacitance to determine the position of the change in capacitance on the touch screen.

Capacitive touch sensors radiate electromagnetic emissions. Radiated emissions caused by driving their electrodes with signals may exceed the limits set by standards such as CISPR-25 for automotive applications. CISPR-25 is an international standard that contains limits and procedures for the measurement of radio disturbances. CISPR-25 applies to any electronic/electrical component intended for use in vehicles, trailers and devices. The radiation emission limits are intended to protect receivers installed in a vehicle from disturbances produced by components/modules in the same vehicle.

There is a need for systems and methods to reduce touchscreen radiated emissions.

SUMMARY

According to aspects, there is provided a method comprising: providing a capacitive sensing system comprising first, second, third, and fourth transmit electrodes and a receive electrode positioned to have mutual capacitances between the first, second, third, and fourth transmit electrodes and the receive electrode at mutual capacitance nodes, wherein the mutual capacitance at respective ones of the mutual capacitance nodes changes when an interfering object is proximate; applying a first drive signal to the first transmit electrode; measuring a first radiated emission from the capacitive sensing system when the first drive signal is applied; applying a second drive signal to the second transmit electrode; measuring a second radiated emission from the capacitive sensing system when the second drive signal is applied; applying a third drive signal to the third transmit electrode; measuring a third radiated emission from the capacitive sensing system when the third drive signal is applied; applying a fourth drive signal to the fourth transmit electrode; measuring a fourth radiated emission from the capacitive sensing system when the fourth drive signal is applied; and controlling application of a drive signal to a transmit electrode based on the first, second, third, and fourth radiated emissions to reduce a radiated emission from the capacitive sensing system.

Aspects as in the preceding paragraph provide a method, wherein controlling application of the drive signal to the transmit electrode comprises assigning the drive signal to one of the first, second, third, and fourth transmit electrodes.

Aspects as in one of the two preceding paragraphs provide a method, wherein controlling application of the drive signal to the transmit electrode comprises ordering in time first, second, third, and fourth chips of the drive signal.

Aspects as in one of the three preceding paragraphs provide a method, wherein controlling application of the drive signal to the transmit electrode comprises inverting a polarity of the drive signal during a chip of the drive signal.

Aspects as in one of the four preceding paragraphs provide a method, wherein controlling application of the drive signal to the transmit electrode comprises: assigning the drive signal to the transmit electrode; and ordering in time first, second, third, and fourth chips of the drive signal.

Aspects as in one of the five preceding paragraphs provide a method, wherein controlling application of the drive signal to the transmit electrode comprises: assigning the drive signal to one of the first, second, third, and fourth transmit electrodes; and inverting a polarity of the drive signal during a chip of the drive signal.

Aspects as in one of the six preceding paragraphs provide a method, wherein controlling application of the drive signal to the transmit electrode comprises: ordering in time first, second, third, and fourth chips of the drive signal; and inverting a polarity of the drive signal during a chip of the drive signal.

Aspects as in one of the seven preceding paragraphs provide a method, wherein controlling application of the drive signal to the transmit electrode comprises: assigning the drive signal to one of the first, second, third, and fourth transmit electrodes; ordering in time first, second, third, and fourth chips of the drive signal; and inverting a polarity of the drive signal during a chip of the drive signal.

According to aspects, there is provided a system comprising: a capacitive sensing system comprising first, second, third, and fourth transmit electrodes and a receive electrode positioned to have mutual capacitances between the first, second, third, and fourth transmit electrodes and the receive electrode at mutual capacitance nodes, wherein the mutual capacitance at respective ones of the mutual capacitance nodes changes when an interfering object is proximate; a controller circuit to apply a drive signal to a transmit electrode to reduce a radiated emission from the capacitive sensing system based on: a measured radiation emission for the capacitive sensing system when a first drive signal is applied to the first transmit electrode, a measured radiation emission for the capacitive sensing system when a second drive signal is applied to the second transmit electrode, a measured radiation emission for the capacitive sensing system when a third drive signal is applied to the third transmit electrode, and a measured radiation emission for the capacitive sensing system when a fourth drive signal is applied to the fourth transmit electrode.

Aspects as in the preceding paragraph provide a system, wherein the controller circuit is to apply the drive signal to the transmit electrode to reduce a radiated emission from the capacitive sensing system by assigning the drive signal to one of the first, second, third, and fourth transmit electrodes.

Aspects as in one of the two preceding paragraphs provide a system, wherein the controller circuit is to apply the drive signal to the transmit electrode to reduce a radiated emission from the capacitive sensing system by ordering in time first, second, third, and fourth chips of the drive signal.

Aspects as in one of the three preceding paragraphs provide a system, wherein the controller circuit is to apply the drive signal to the transmit electrode to reduce a radiated emission from the capacitive sensing system by inverting a polarity of the drive signal during a chip of the drive signal.

Aspects as in one of the four preceding paragraphs provide a system, wherein the controller circuit is to apply the drive signal to the transmit electrode to reduce a radiated emission from the capacitive sensing system by: assigning the drive signal to one of the first, second, third, and fourth transmit electrodes; and ordering in time first, second, third, and fourth chips of the drive signal.

Aspects as in one of the five preceding paragraphs provide a system, wherein the controller circuit is to apply the drive signal to the transmit electrode to reduce a radiated emission from the capacitive sensing system by: assigning the drive signal to one of the first, second, third, and fourth transmit electrodes; and inverting a polarity of the drive signal during a chip of the drive signal.

Aspects as in one of the six preceding paragraphs provide a system, wherein the controller circuit is to apply the drive signal to the transmit electrode to reduce a radiated emission from the capacitive sensing system by: ordering in time first, second, third, and fourth chips of the drive signal; and inverting a polarity of the drive signal during a chip of the drive signal.

Aspects as in one of the seven preceding paragraphs provide a system, wherein the controller circuit is to apply the drive signal to the transmit electrode to reduce a radiated emission from the capacitive sensing system by: assigning the drive signal to one of the first, second, third, and fourth transmit electrodes; ordering in time first, second, third, and fourth chips of the drive signal; and inverting a polarity of the drive signal during a chip of the drive signal.

According to aspects, there is provided a system comprising: a capacitive sensing system comprising first, second, third, and fourth transmit electrodes and a receive electrode positioned to have mutual capacitances between the first, second, third, and fourth transmit electrodes and the receive electrode at mutual capacitance nodes, wherein the mutual capacitance at respective ones of the mutual capacitance nodes changes when an interfering object is proximate; a controller circuit to: apply first, second, third, and fourth orthogonal drive signals to the first transmit electrode during first, second, third, and fourth chips, respectively; apply fifth, sixth, seventh, and eighth orthogonal drive signals to the second transmit electrode during the first, second, third, and fourth, chips, respectively; apply ninth, tenth, eleventh, and twelfth orthogonal drive signals to the third transmit electrode during the first, second, third, and fourth chips, respectively; apply thirteenth, fourteenth, fifteenth, and sixteenth orthogonal drive signals to the fourth transmit electrode during the first, second, third, and fourth chips, respectively; wherein the drive signals are based on: a measured radiation emission for the capacitive sensing system when a drive signal is applied to the first transmit electrode, a measured radiation emission for the capacitive sensing system when a drive signal is applied to the second transmit electrode, a measured radiation emission for the capacitive sensing system when a drive signal is applied to the third transmit electrode and a measured radiation emission for the capacitive sensing system when a drive signal is applied to the fourth transmit electrode.

Aspects as in the preceding paragraph provide a system, wherein the controller circuit is to assign the drive signals to the first, second, third, and fourth transmit electrodes during the first, second, third, and fourth chips to reduce a radiation emission of the capacitive sensing system.

Aspects as in one of the two preceding paragraphs provide a system, wherein the controller circuit is to order in time drive signals of the first, second, third, and fourth chips to reduce a radiation emission of the capacitive sensing system.

Aspects as in one of the three preceding paragraphs provide a system, wherein the controller circuit is to invert polarities of the drive signals of one of the first, second, third, or fourth chips to reduce a radiation emission of the capacitive sensing system.

BRIEF DESCRIPTION OF THE DRAWINGS

A more complete understanding of the disclosure and the advantages thereof may be acquired by referring to the following description, taken in conjunction with the accompanying drawings and wherein.

Figure 1A:
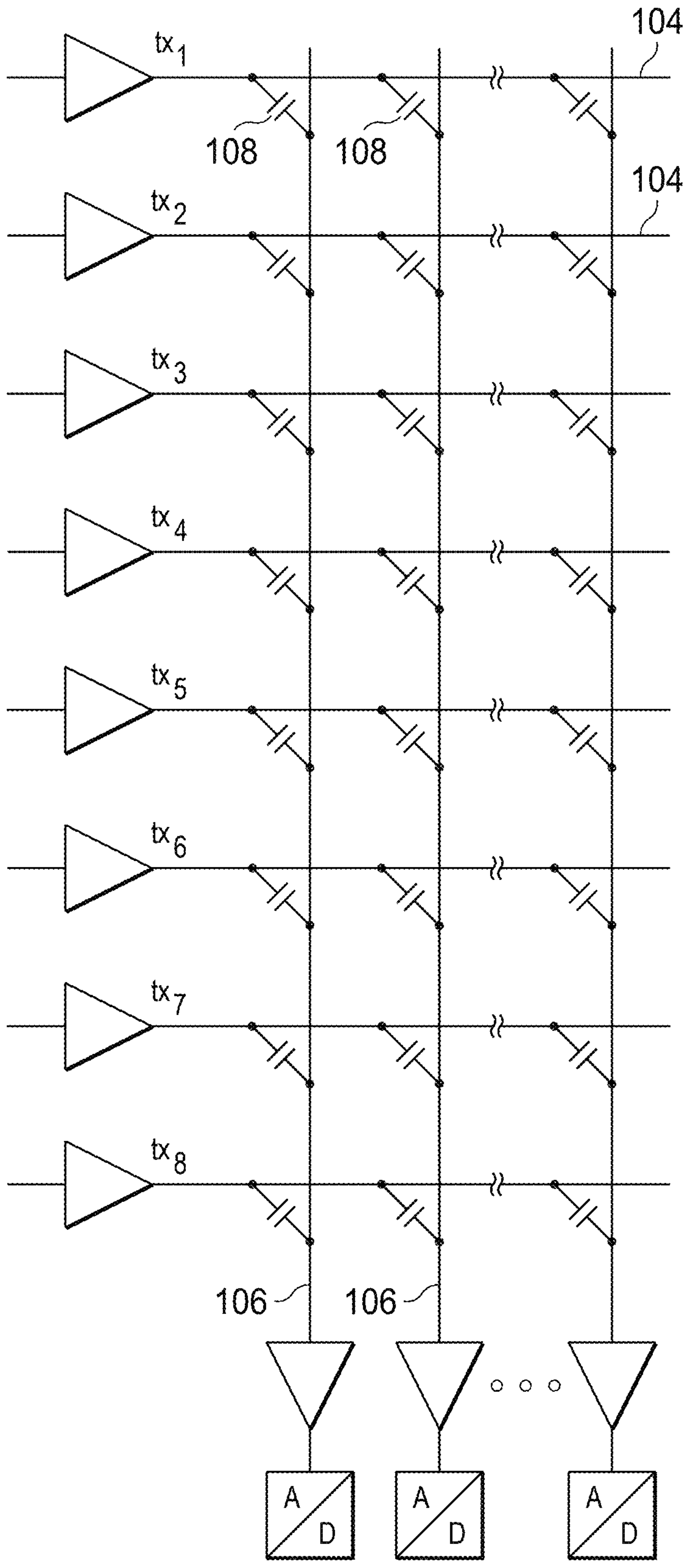
FIG. 1A shows a schematic representation of a touchscreen having transmit lines and receive lines, wherein mutual capacitance nodes are found where the transmit electrodes form mutual capacitance nodes with the receive electrode.

The drawings accompanying and forming part of this specification are included to depict certain aspects of the disclosure. The reference number for any illustrated element that appears in multiple different figures has the same meaning across the multiple figures, and the mention or discussion herein of any illustrated element in the context of any particular figure also applies to each other figure, if any, in which that same illustrated element is shown. The features illustrated in the drawings are not necessarily drawn to scale. It should be noted that the features illustrated in the drawings are not necessarily drawn to scale.

DESCRIPTION

Because the measured radiated emission is the sum of the radiation from individual transmitter (X) electrodes of a touchscreen, CDMA mappings may benefit from the cancellation effect where positive signals on some electrodes are offset by equivalent negative signals on others. Further, because the touchscreen's shape, position, or orientation often result in uneven individual emissions from the transmitter (X) electrodes, perfect cancellation may be unattainable and some residual emission may exist in actual practice. Touchscreen residual emission may be reduced by the assignment of code to electrodes, the order of chips, and the polarity of the chips.

First, the amplitude of the residual emission per chip may be reduced by reassigning CDMA codes to TX electrodes, either systematically or using a heuristic approach or manipulation techniques like a simulated software annealing.

Second, the skirt of the emitted spectrum of the residual emission may be reduced by ordering the chips by their absolute amplitude and scheduling their appearance so that chips at the beginning and end of the scan have the lowest amplitude, while those in the middle have the highest amplitude. This approach functions as an envelope control, reducing the skirt of the emitted spectrum.

Third, the residual emission may be reduced by modifying chip polarity by inverting the polarity of all transmit signals applied to the X electrodes. This modulates the polarity of the residue within the scan. This is analogous to AM modulation with a 200% index, which spreads the emission spectrum and reduces the power emitted in a single region of the spectrum.

Figure 1B:
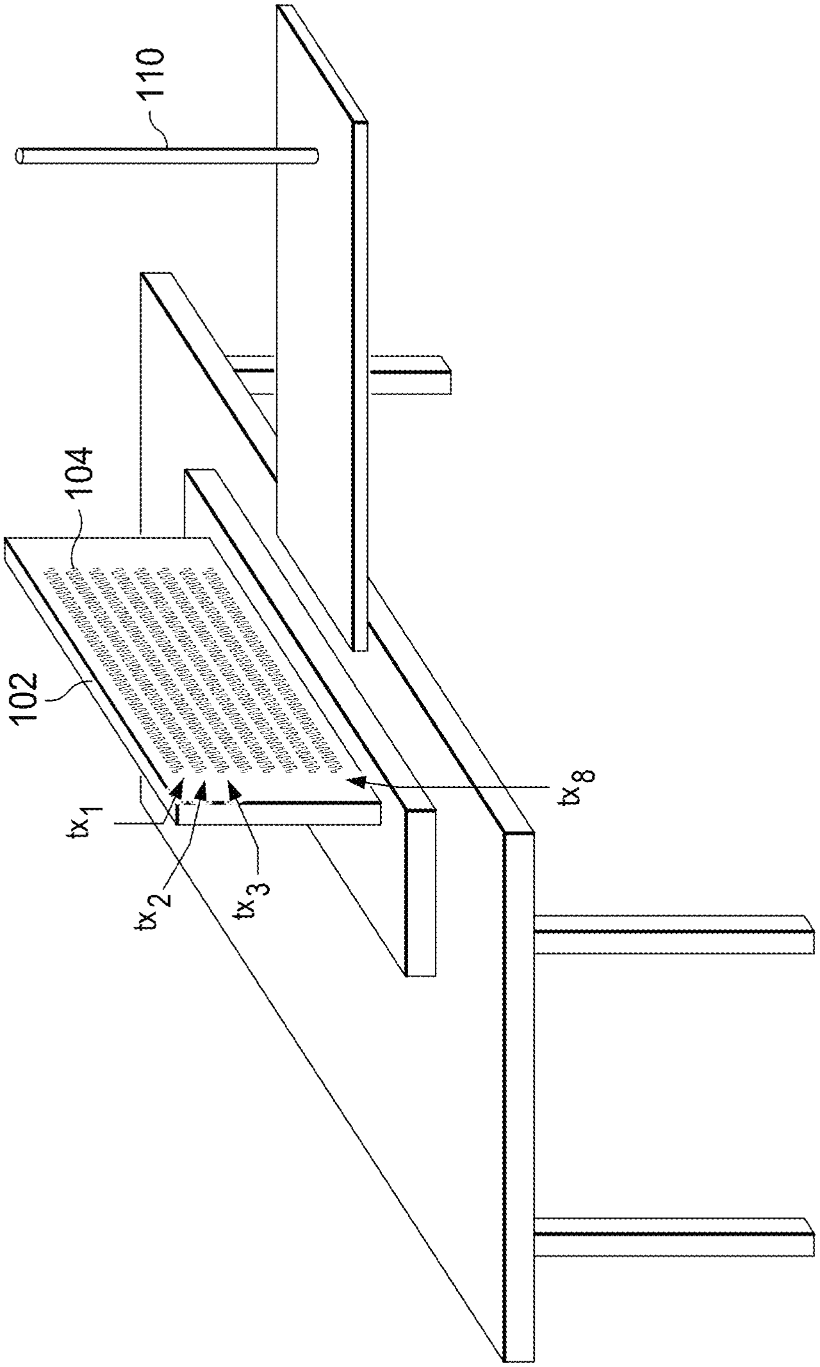
FIG. 1B shows a sample touchscreen positioned opposite a receiver antenna, wherein the receiver antenna is able to measure radiated emission from the touchscreen.
Figure 1C:
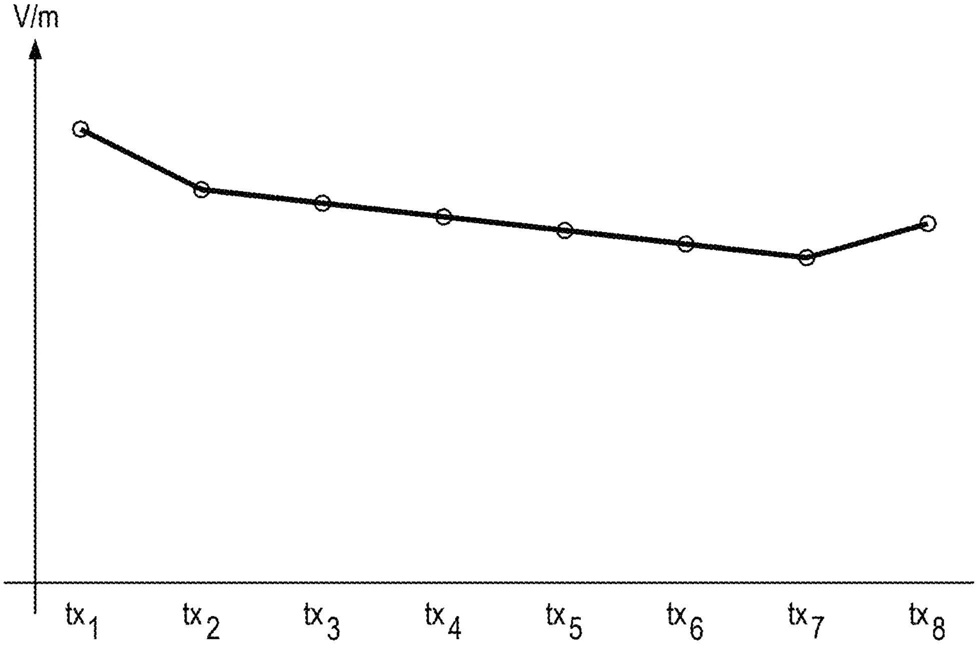
FIG. 1C shows a graph of measured radiated emissions from the touchscreen.

FIGS. 1A-1C illustrate a test setup for measuring radiated emissions from a touchscreen. FIG. 1A shows a schematic representation of a touchscreen 102 having transmit lines 104 and receive lines 106, wherein mutual capacitance nodes 108 are found where the transmit electrodes $tx_1$-$tx_8$ form mutual capacitance nodes with the receive electrode $rx_1$-$rx_n$. FIG. 1B shows a sample touchscreen 102 positioned opposite a receiver antenna 110, wherein the receiver antenna 110 is able to measure radiated emission from the touchscreen 102. FIG. 1C shows a graph of measured radiated emissions from the touchscreen 102. An individual transmit electrode is activated with a periodic stimulus drive signal for a specific duration and the radiated emission is measured for the individual transmit electrode. Note that transmit electrodes $tx_1$ and $tx_8$, which are positioned at the top and bottom of the touchscreen, respectively, produce higher radiated emissions from the touchscreen.

Figure 2A:
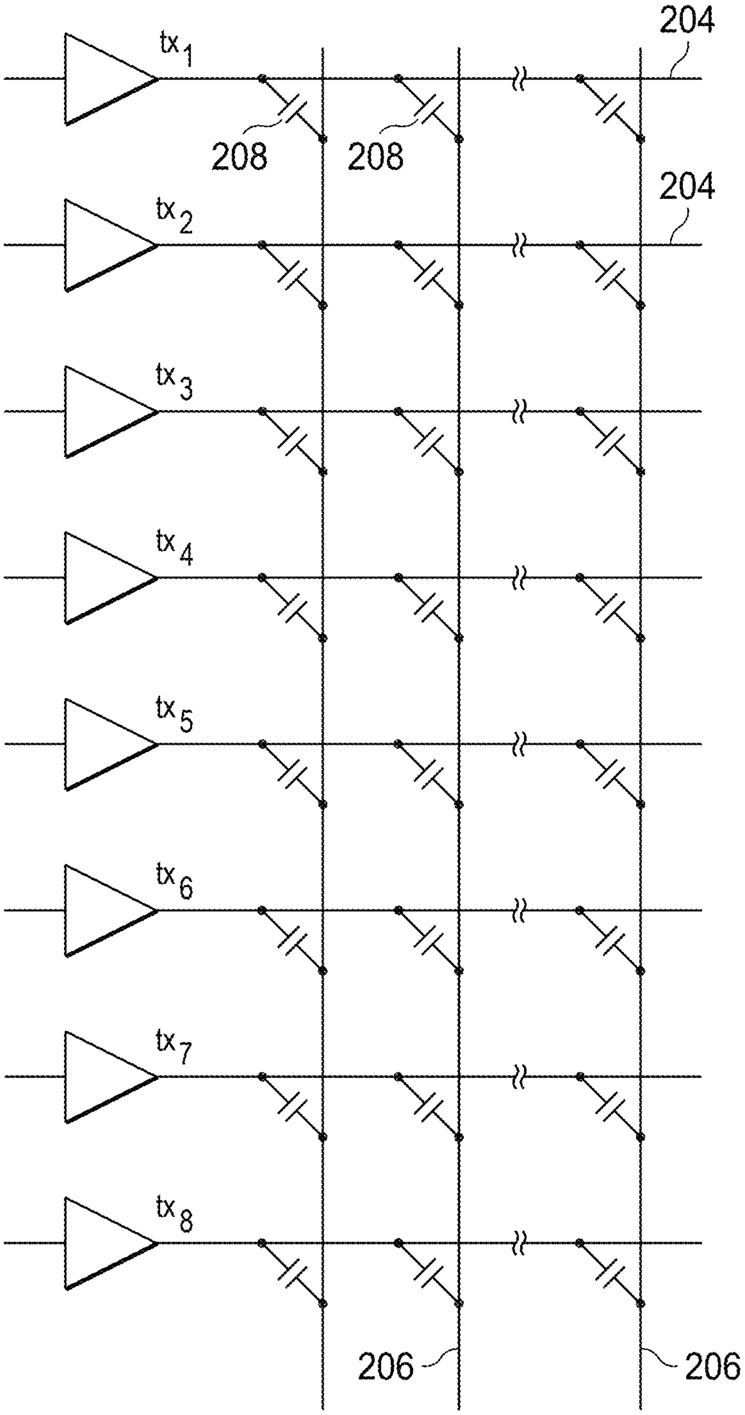
FIG. 2A shows a schematic of the two-dimensional touchscreen of FIG. 1B with transmitter (X) electrodes and receiver (Y) electrodes arranged in rows and columns to form a matrix of mutual capacitance nodes.

FIG. 2A shows a schematic of the two-dimensional touchscreen of FIG. 1B with transmitter (X) electrodes 204 and receiver (Y) electrodes 206 arranged in rows and columns to form a matrix of mutual capacitance nodes 208.

Figure 2B:
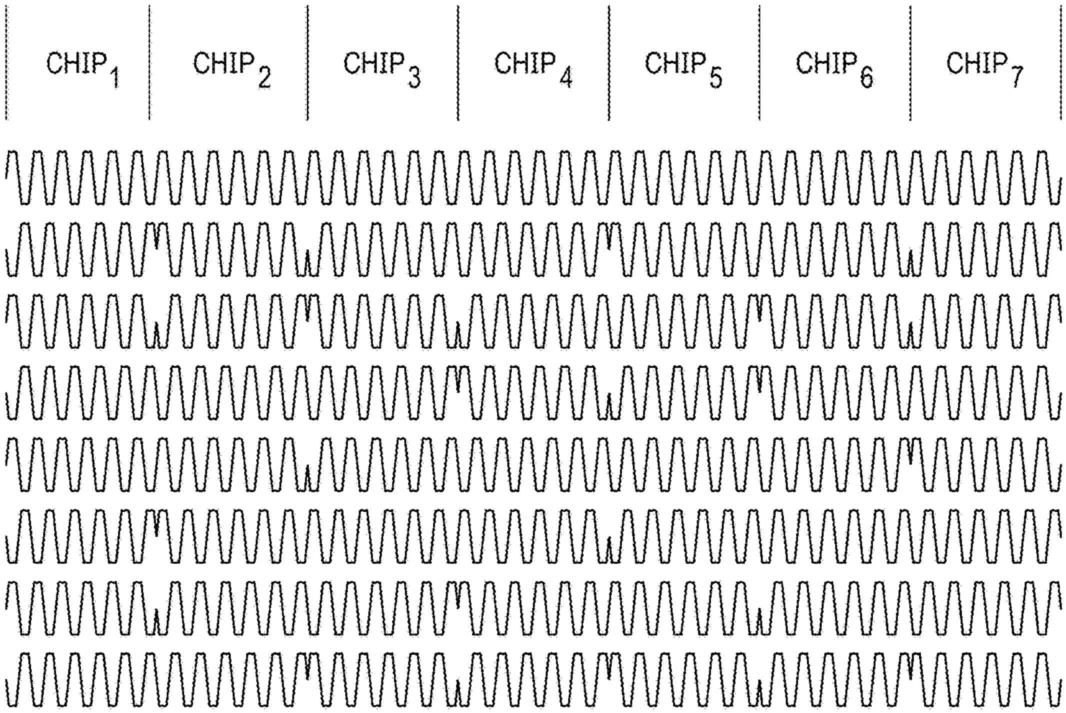
FIG. 2B shows an ideal transmission for the two-dimensional touchscreen of FIG. 1B.

FIG. 2B shows an ideal transmission for the two-dimensional touchscreen of FIG. 1B with electrodes that function as transmitters (X) or receivers (Y), arranged in rows and columns to form a matrix of mutual capacitance nodes 208. The transmitter (X) electrodes 204 are activated with periodic stimulus signals for a specific duration, each referred to as a "chip," to measure the capacitive coupling between the X and Y electrodes. This example applies code division multiplexed access (CDMA), where the periodic stimulus signals during chips on the transmitter (X) electrodes 204 follow matrices with columns orthogonal to each other. The ideal transmission assumes 100% of the activation periodic stimulus signals pass through the system and are received by the receiver (Y) electrodes 206. The ideal chips have exactly the same emission and are ideally measured as a "1" or a "−1" indicating polarity. Because the periodic stimulus signals activate the transmit electrodes $tx_1$-$tx_8$ 204 during the chips with the same number of "1" and "−1" signals, the net residue for the chips is 0.0 V/m. For example, the periodic stimulus signals during $chip_1$ activate transmit electrodes $tx_1$, $tx_3$, $tx_5$, and $tx_7$ with a positive polarity "1" signal and activate transmit electrodes $tx_2$, $tx_4$, $tx_6$, and $tx_8$ with a negative polarity "−1" signal, so that the net residue during $chip_1$ is 0.0 V/m.

Figure 2C:
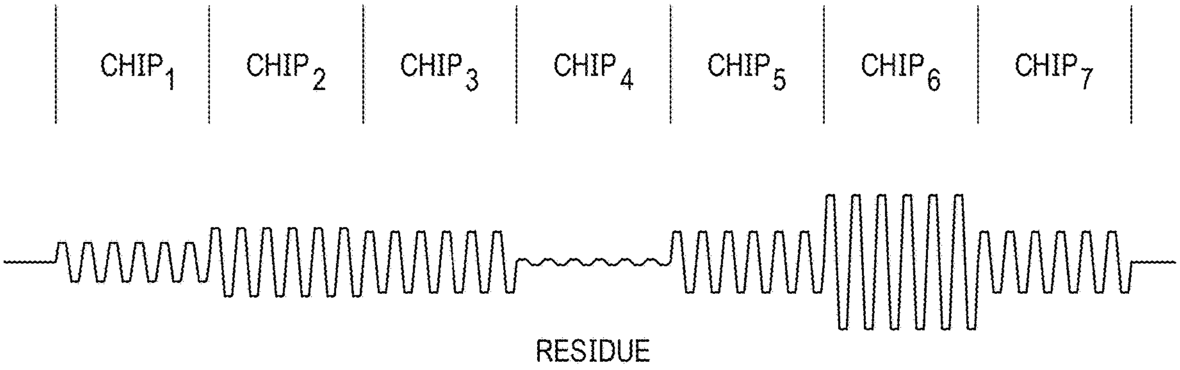
FIG. 2C shows an actual transmission for the two-dimensional touchscreen of FIG. 1B.

FIG. 2C shows an actual transmission for the two-dimensional touchscreen of FIG. 1B. The transmitter (X) electrodes 204 are actually activated with periodic stimulus signals for a specific duration, each referred to as a "chip," to measure the capacitive coupling between the X and Y electrodes. The actual transmissions by transmitter (X) electrodes 204 produce varying radiated emission levels of the activation periodic stimulus signals passing through the system and received by the receiver (Y) electrodes 206: $tx_1$=1.40 V/m; $tx_2$=1.20 V/m; $tx_3$=1.16 V/m; $tx_4$=1.12 V/m; $tx_5$=1.08 V/m; $tx_6$=1.04 V/m; $tx_7$=1.00 V/m; and $tx_8$=1.10 V/m. The actual periodic stimulus signals during chips produce the radiated emissions measured and shown in FIG. 2C. Because the periodic stimulus signals activate the transmit electrodes $tx_1$-$tx_8$ 204 during chips and produce variable levels of radiated emission, the net residue for the chips is not 0.0 V/m. For example, the periodic stimulus signals during $chip_1$ activate transmit electrodes $tx_1$, $tx_3$, $tx_5$, and $tx_7$ to produce radiated emissions: $tx_1$=1.40 V/m; $tx_2$=−1.20 V/m; $tx_3$=1.16 V/m; $tx_4$=−1.12 V/m; $tx_5$=1.08 V/m; $tx_6$=−1.04 V/m; $tx_7$=1.00 V/m; and $tx_8$=−1.10 V/m, so that the net residue during $chip_1$ is 0.18 V/m. The periodic stimulus signals during $chip_2$ are responsible for radiated emission of 0.34 V/m net residue. The periodic stimulus signals during $chip_3$ are responsible for radiated emission of 0.30 V/m net residue. The periodic stimulus signals during $chip_4$ are responsible for radiated emission of 0.02 V/m net residue. The periodic stimulus signals during $chip_5$ are responsible for radiated emission of 0.30 V/m net residue. Note that periodic stimulus signals during $chip_6$ are responsible for the peak radiated emission at 0.66 V/m net residue. The periodic stimulus signals during $chip_7$ are responsible for radiated emission of 0.30 V/m net residue.

Figure 3:
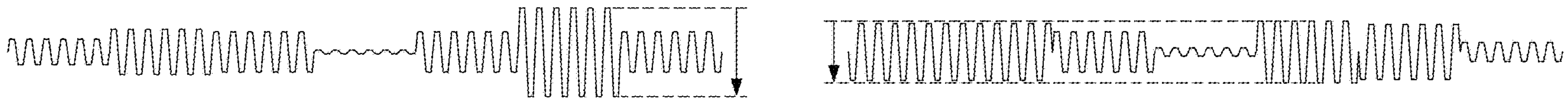
FIG. 3 shows that radiated emission from a touchscreen may be reduced by reassigning CDM codes to different transmit electrodes.

FIG. 3 shows that radiated emission from a touchscreen may be reduced by reassigning CDM codes to different transmit electrodes. As described with reference to FIGS. 1C and 2B, TX electrodes are driven individually to measure a radiated emission level for individual TX electrodes. The residual emission from a CDM code may then be computed by weighting the CDM code with the emission level of the electrodes. The residue emission may then be reduced by permuting or rearranging sets of rows of the CDM code, which is equivalent to permuting or rearranging the assignment of TX electrodes. Any method may be used to determine an arrangement that produces a lower or the lowest radiated emission. A systematic search is possible for low electrodes count. Alternatively, a simulated software annealing, or other manipulation techniques may be used otherwise, where a subset of rows are permuted or rearranged and tested for possible improvement of the net residue. As shown in FIG. 3, reassigning CDM code to different transmit electrodes may result in a lower maximum radiated emission across the individual chips. Prior to rearrangement, the largest radiated emission was generated during $chip_6$ at 0.66 V/m. After rearrangement, the radiated emissions are more evenly generated, and the largest radiated emission was generated during $chip_5$ at 0.46 V/m.

Figure 4:
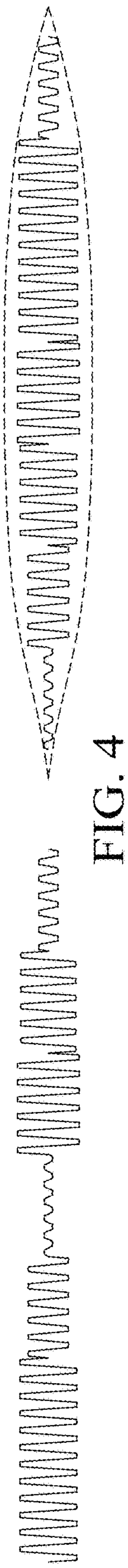
FIG. 4 shows that radiated emission from a touchscreen may be reduced by reordering periodic stimulus signals during chips so that the radiated emissions fit within an envelope having lower emissions at the ends and larger emissions in the middle of the envelope.

FIG. 4 shows that radiated emission from a touchscreen may be reduced by reordering periodic stimulus signals during chips so that the radiated emissions fit within an envelope having lower emissions at the ends and larger emissions in the middle of the envelope. As illustrated in FIG. 4, the periodic stimulus signals during $chip_4$ and $chip_7$ have relatively lower net radiated emissions and are reordered so that the periodic stimulus signals during $chip_4$ are in the first position and the periodic stimulus signals during $chip_7$ remain in the last position. The periodic stimulus signals during $chip_5$ have the relatively highest net radiated emission and is reordered so that these signals are in the fourth or middle position.

Figure 5:
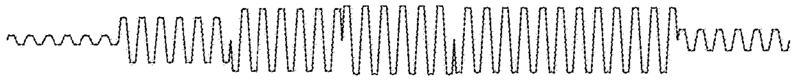
FIG. 5 shows that radiated emission from a touchscreen may be reduced by modulating or inverting the polarities of the CDM code.
Figure 5:
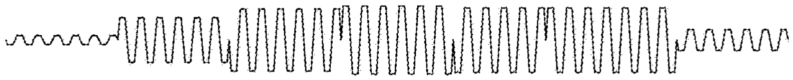

FIG. 5 shows that radiated emission from a touchscreen may be reduced by modulating or inverting the polarities of the CDM code. As illustrated in FIG. 5, the polarities of $chip_1$, $chip_6$, and $chip_7$ are modulated or inverted. Note that the matric still has CDM codes with columns orthogonal to each other.

Figure 6:
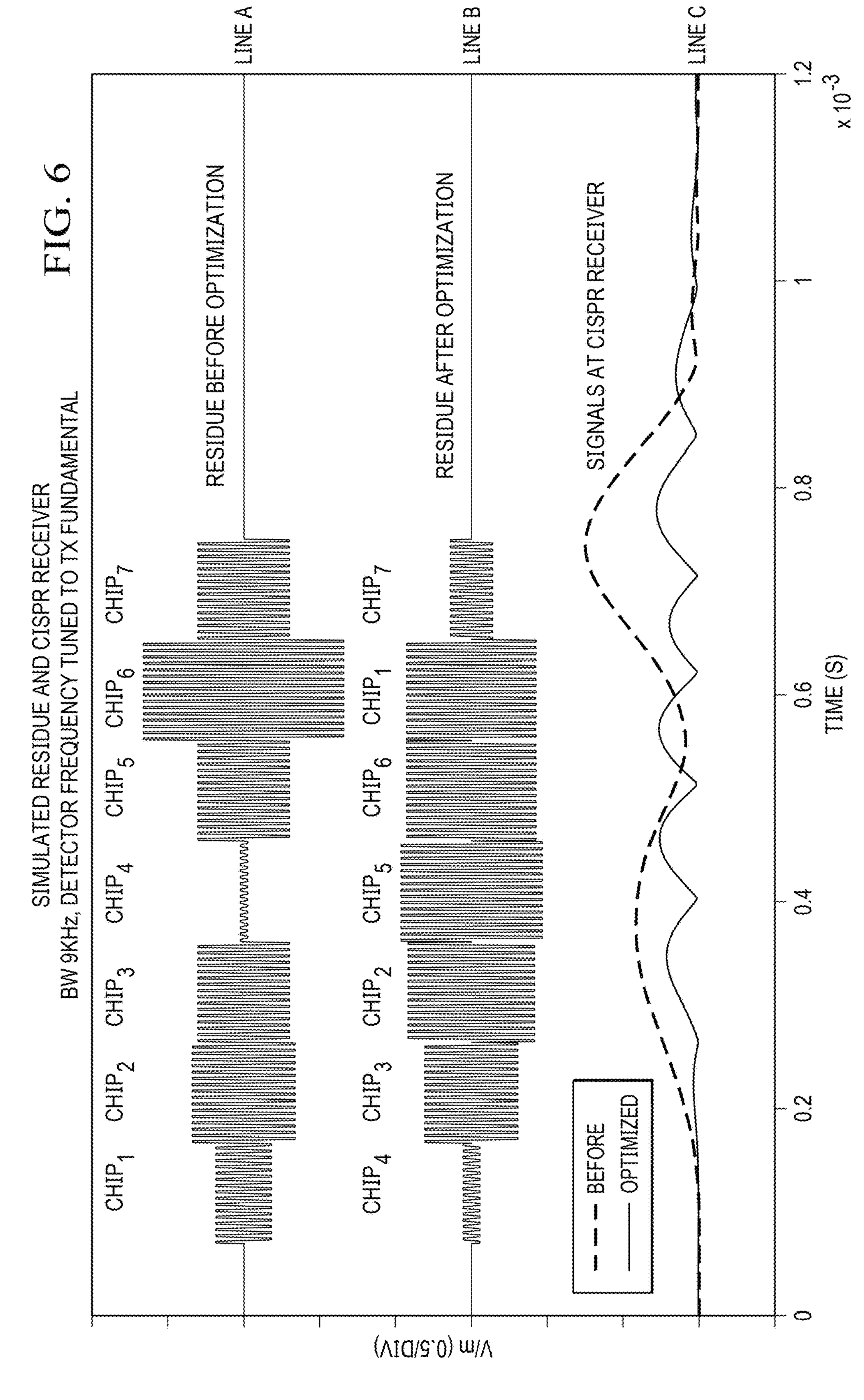
FIG. 6 shows graphic output for a simulated radiated emission residue measured by a CISPR receiver at a bandwidth of 9000 Hz with a detector frequency tuned to a transmitter TX fundamental frequency.

FIG. 6 shows graphic output for a simulated radiated emission residue measured by a CISPR receiver at a bandwidth of 9000 Hz with a detector frequency tuned to a transmitter TX fundamental frequency. Line A shows the simulated residue for periodic stimulus signals during $chip_1$-$chip_7$ before any residue manipulation techniques are employed. Line B shows the simulated residue for periodic stimulus signals during $chip_1$-$chip_7$ after residue manipulation techniques (reassignment of CDM code to electrodes, reorder chips, and invert polarity of chips) are employed. Line C shows the simulated signals received at the CISPR receiver for the signals for both before and after residue manipulation techniques are employed.

Figure 7:
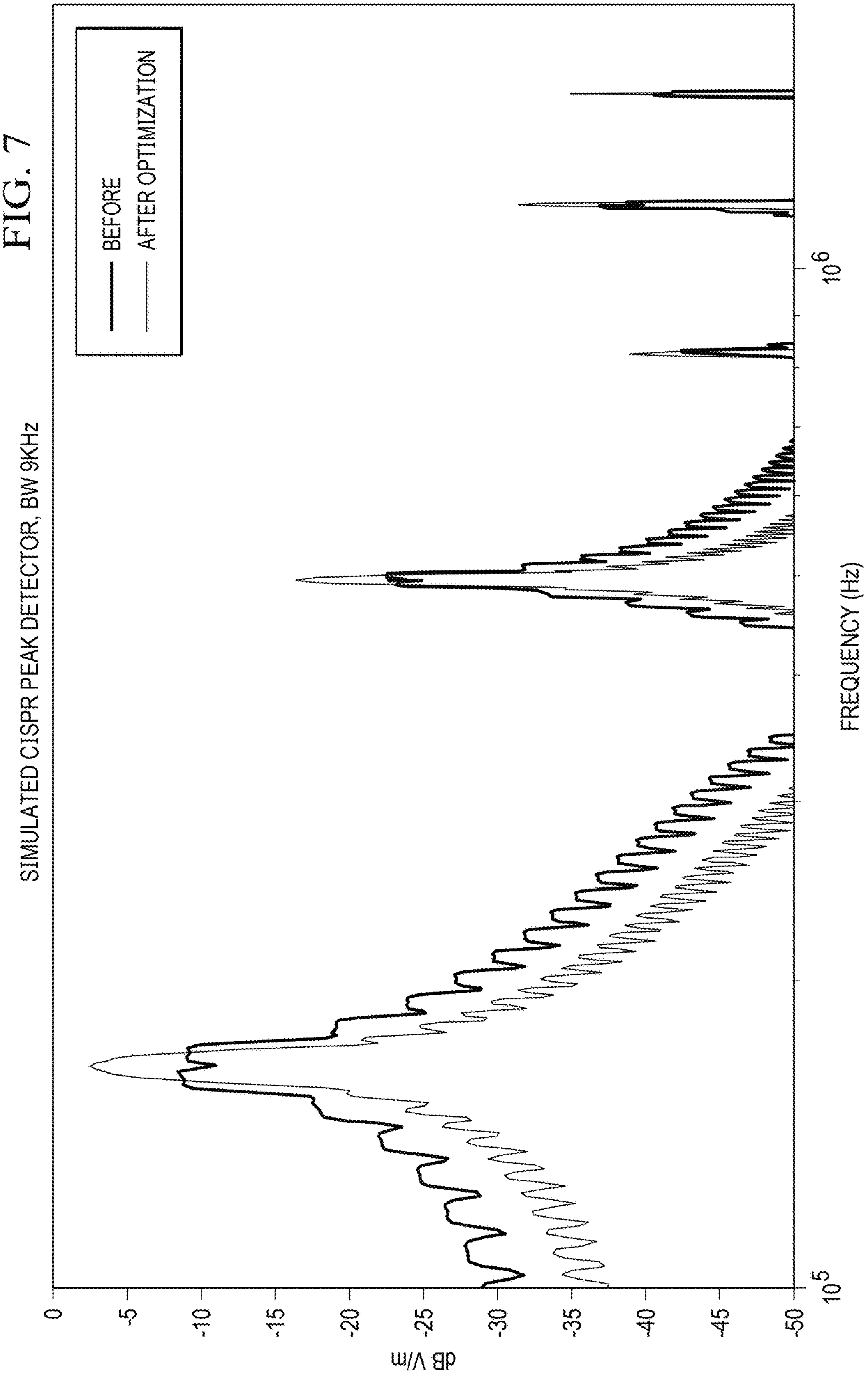
FIG. 7 shows a graphic output for a simulated CISPR peak detector at a bandwidth of 9000 Hz.

FIG. 7 shows a graphic output for a simulated CISPR peak detector at a bandwidth of 9000 Hz. Before and after manipulation output peaks are shown. Note that after manipulation, the peaks at harmonic frequencies are lower and skirts of the peaks are wider and higher.

Figure 8:
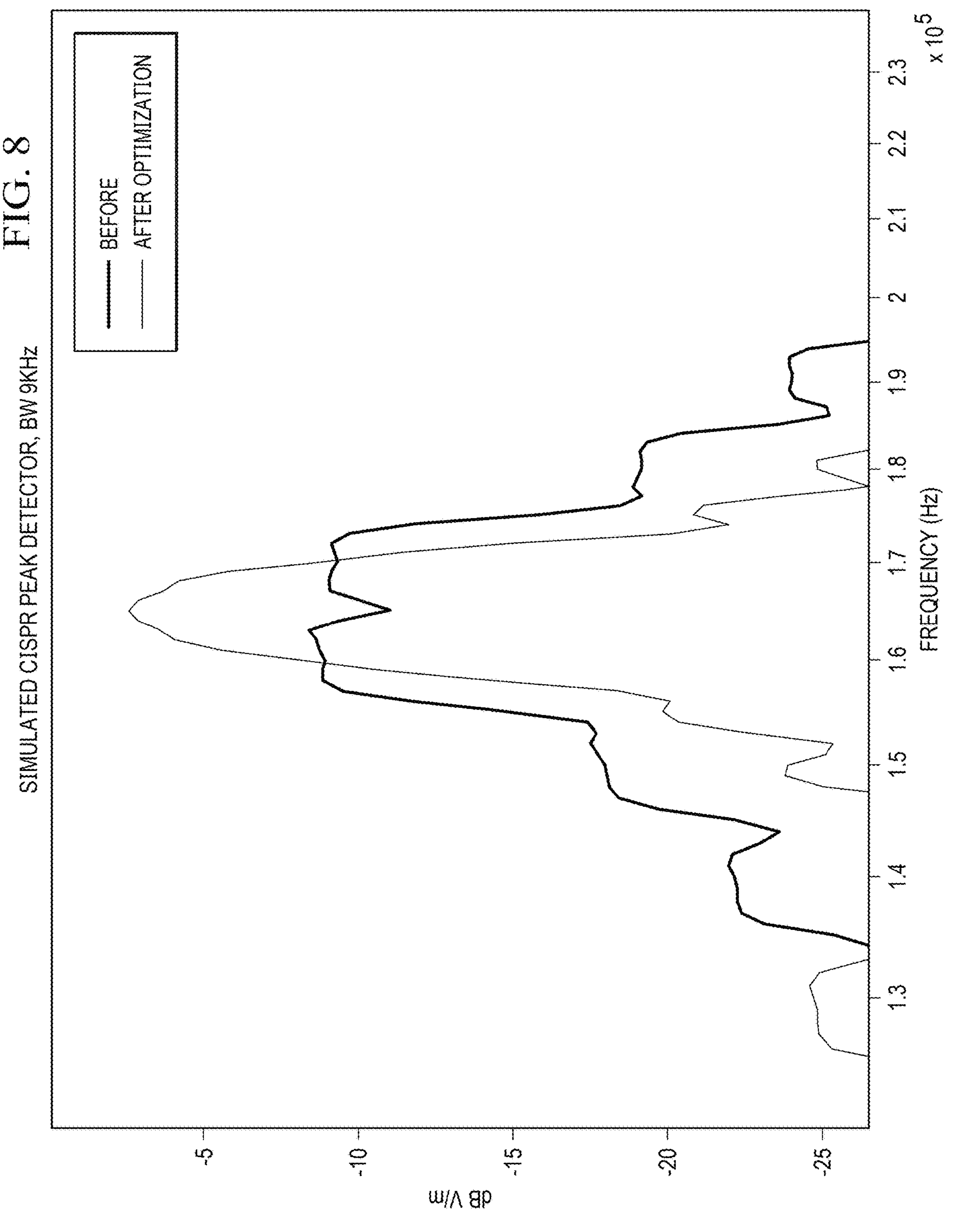
FIG. 8 shows a graphic output for a simulated CISPR peak detector at a bandwidth of 9000 Hz.

FIG. 8 shows a graphic output for a simulated CISPR peak detector at a bandwidth of 9000 Hz. Before and after manipulation output peaks are shown. Note that after manipulation, the peak is lower and the skirt of the peak is wider and higher than before manipulation. For a chip duration of typically 100 μs, the modulation frequency is 5 kHz, which effectively splits the emission in two frequencies separated by 10 kHz. In the CISPR B band with a 9 kHz receiver bandwidth, this manipulation (reassignment of CDM code to electrodes, reorder chips, or invert polarity of chips) has a significant effect.

Figure 9:
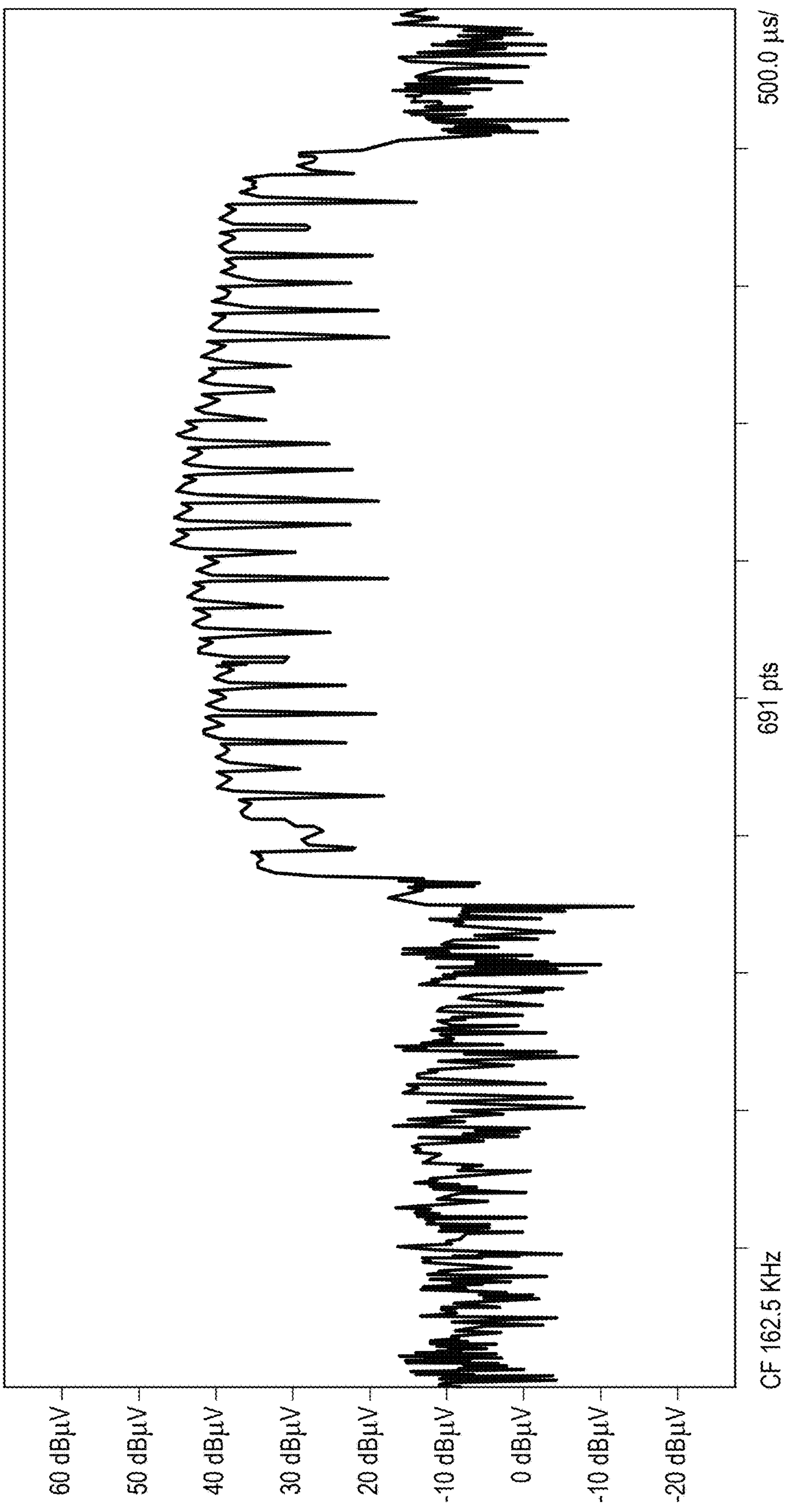
FIG. 9 shows a time domain view of the radiant emission levels of twenty-seven chips.

FIG. 9 shows a time domain view of the radiant emission levels of twenty-seven chips. Such manipulations are visible by the measurement of the touchscreen. A reordering of the chips produces radiant emissions within a rounded envelope. Polarity inversions produce a large drop in the amplitude of radiant emissions.

Figure 10A:
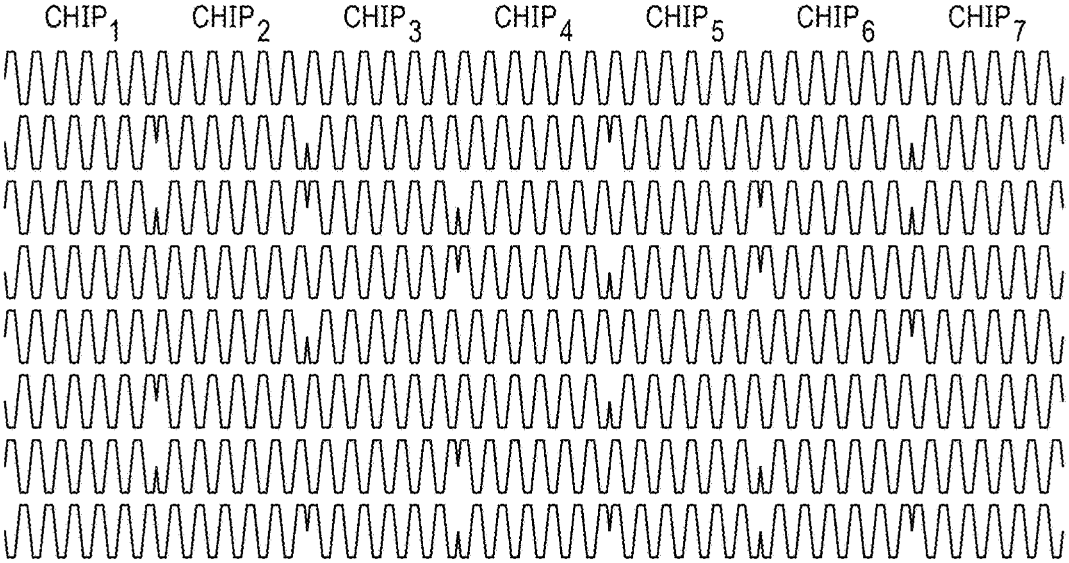
FIGS. 10A-10D show that touchscreen residual emission may be reduced by reassignment of signal codes to transmit electrodes, reorder of chips, and polarity inversion of selected chips.
Figure 10A:
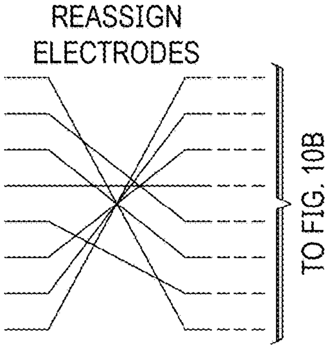
Figure 10A:
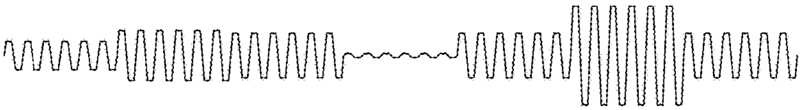
Figure 10B:
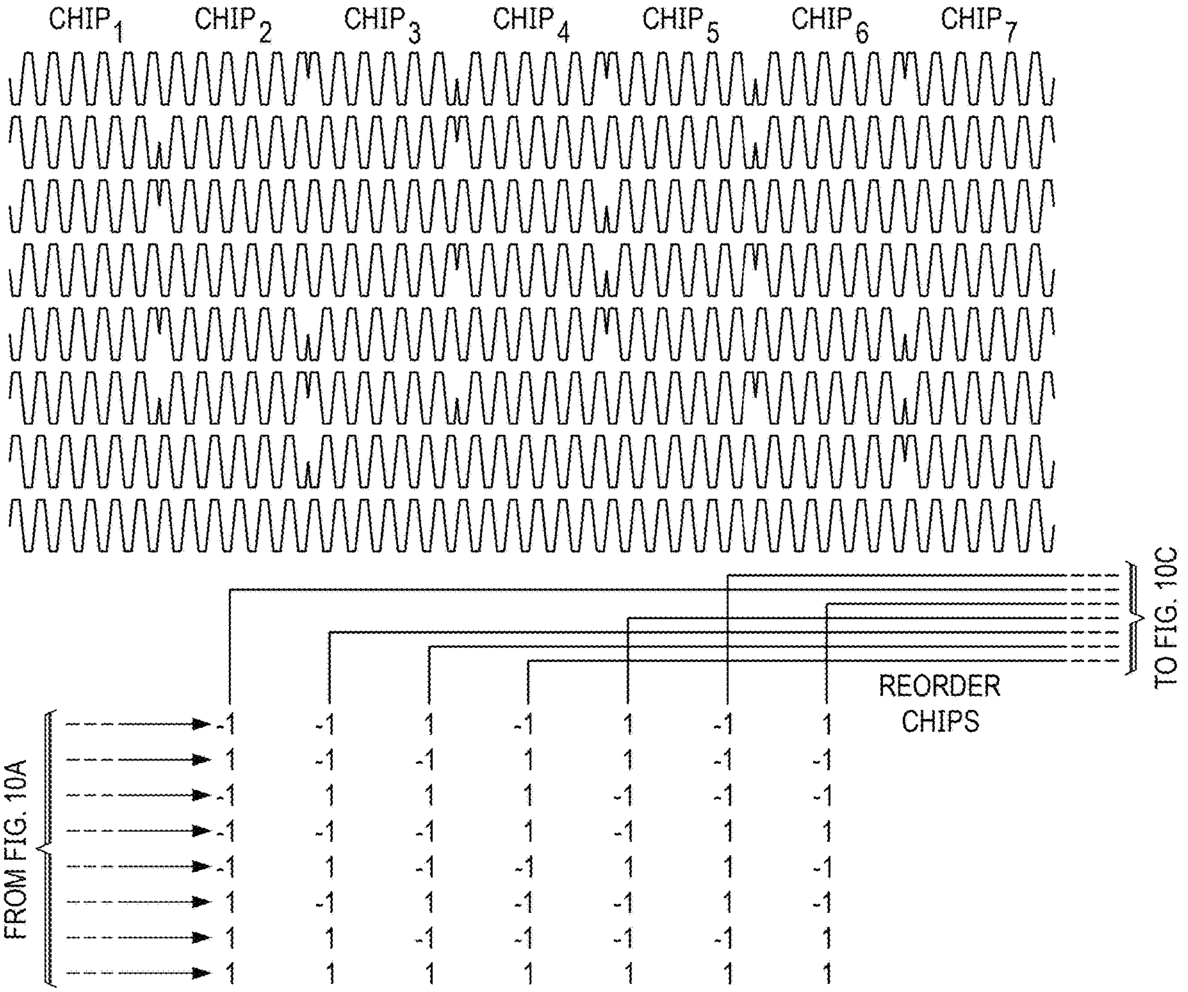
Figure 10B:
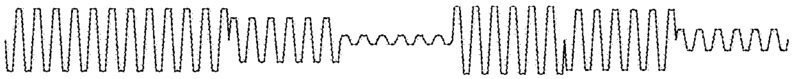
Figure 10C:
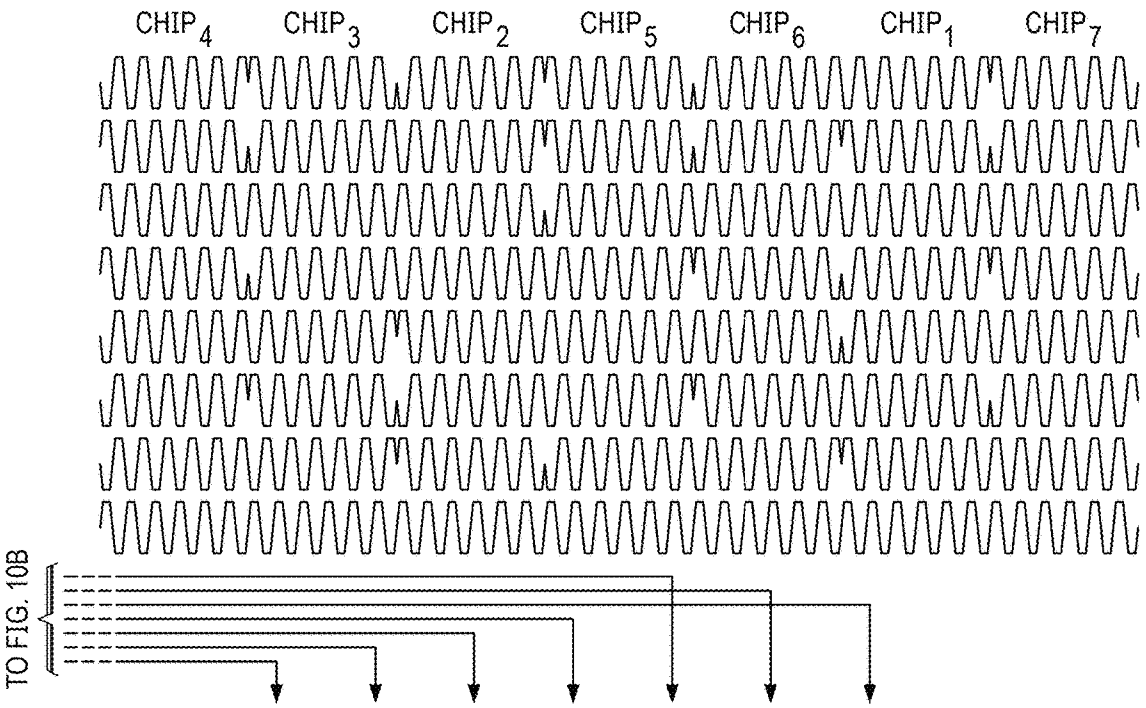
Figure 10C:
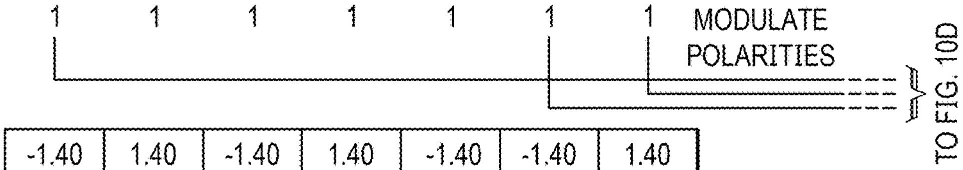
Figure 10C:
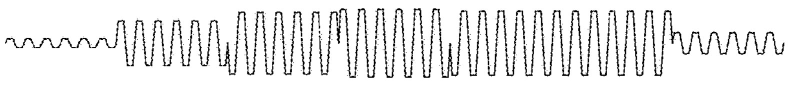
Figure 10D:
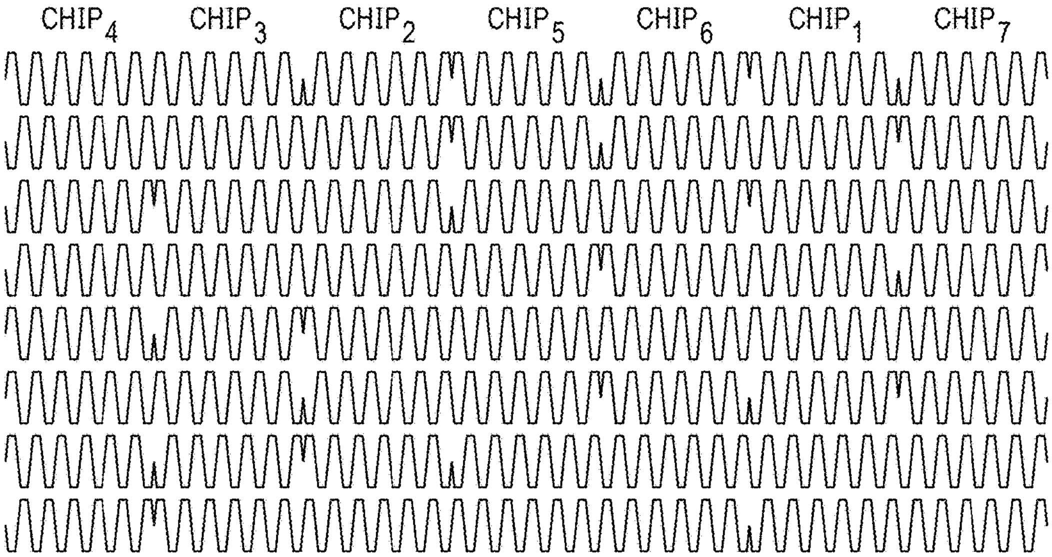
Figure 10D:
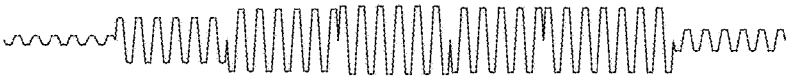

FIGS. 10A-10D show that touchscreen residual emission may be reduced by reassignment of signal codes to transmit electrodes, reorder of chips, and polarity inversion of selected chips. As shown in FIGS. 10A-10B, reassigning CDM code to different transmit electrodes may result in a lower maximum radiated emission across the individual chips. Prior to code reassignment, the largest radiated emission was generated by $chip_6$ at 0.66 V/m. After code reassignment, the radiated emissions are more evenly generated, and the largest radiated emission was generated by $chip_5$ at 0.46 V/m. As illustrated in FIGS. 10B-10C, $chip_4$ and $chip_7$ have relatively lower net radiated emissions and are reordered so that $chip_4$ is in the first position and $chip_7$ remains in the last position. The $chip_5$ has the relatively highest net radiated emission and is reordered so that $chip_5$ is in the fourth or middle position. As illustrated in FIGS. 10C-10D, the polarities of $chip_4$, $chip_1$, and $chip_7$ are modulated or inverted. The result produces a touchscreen residual emission having a lower maximum residual emission and the emissions over time fitting within an envelope having lower emissions at the ends and larger emissions in the middle of the envelope.

Figure 11:
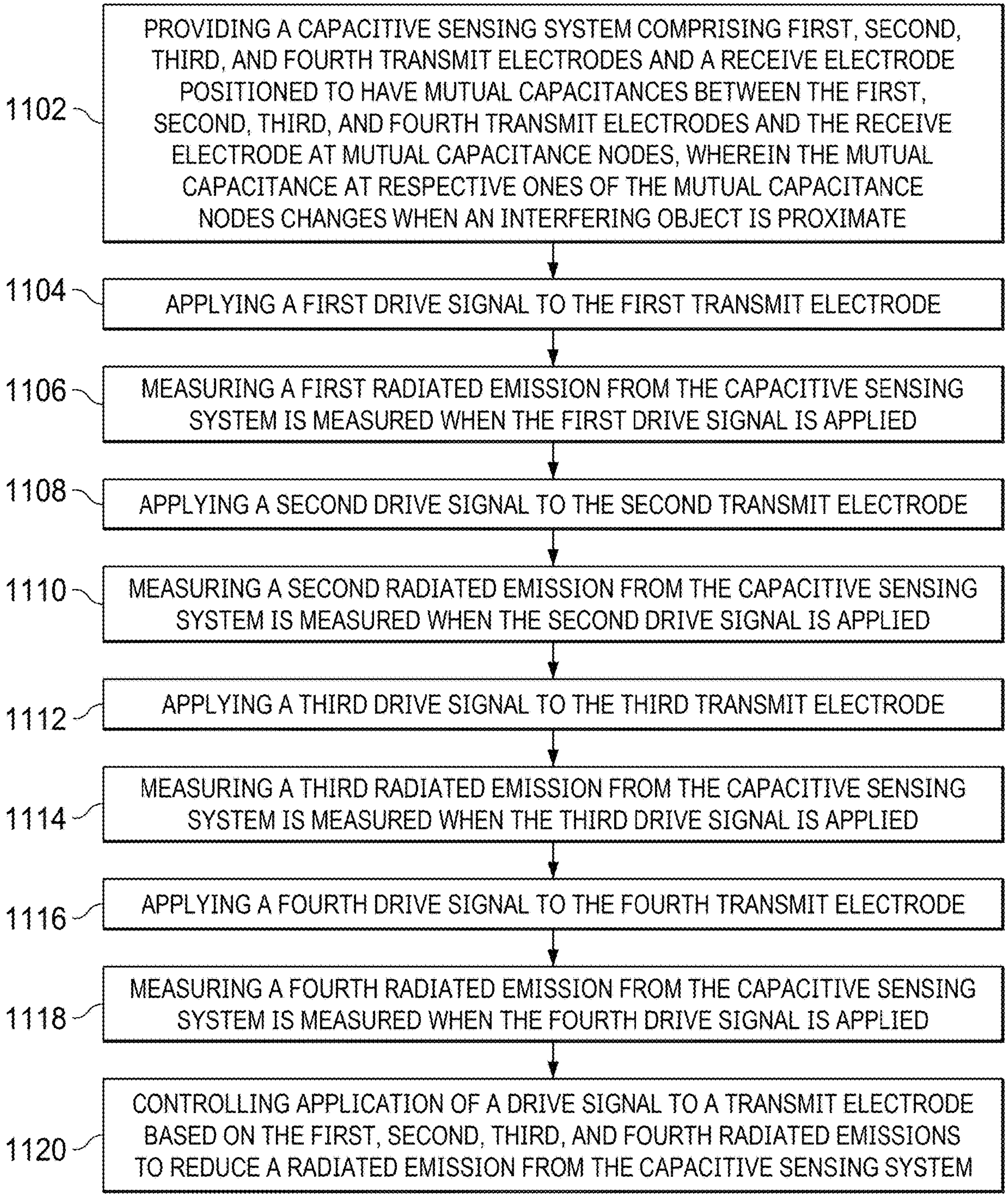
FIG. 11 shows a flow chart of a method to reduce a radiation emission of a capacitive sensing system.

FIG. 11 shows a flow chart of a method to reduce a radiation emission of a capacitive sensing system. A capacitive sensing system is provided 1102 comprising first, second, third, and fourth transmit electrodes and a receive electrode positioned to have mutual capacitances between the first, second, third, and fourth transmit electrodes and the receive electrode at mutual capacitance nodes, wherein the mutual capacitance at respective ones of the mutual capacitance nodes changes when an interfering object is proximate. A first drive signal is applied 1104 to the first transmit electrode. A first radiated emission from the capacitive sensing system is measured 1106 when the first drive signal is applied. A second drive signal is applied 1108 to the second transmit electrode. A second radiated emission from the capacitive sensing system is measured 1110 when the second drive signal is applied. A third drive signal is applied 1112 to the third transmit electrode. A third radiated emission from the capacitive sensing system is measured 1114 when the third drive signal is applied. A fourth drive signal is applied 1116 to the fourth transmit electrode. A fourth radiated emission from the capacitive sensing system is measured 1118 when the fourth drive signal is applied. An application of a drive signal to a transmit electrode is controlled 1120 based on the first, second, third, and fourth radiated emissions to reduce a radiated emission from the capacitive sensing system.

Although examples have been described above, other variations and examples may be made from this disclosure without departing from the spirit and scope of these disclosed examples.

What is claimed is:

1. A method comprising:

providing a capacitive sensing system comprising first, second, third, and fourth transmit electrodes and a receive electrode positioned to have mutual capacitances between the first, second, third, and fourth transmit electrodes and the receive electrode at mutual capacitance nodes, wherein the mutual capacitance at respective ones of the mutual capacitance nodes changes when an interfering object is proximate;

applying a first drive signal to the first transmit electrode;

measuring a first radiated emission from the capacitive sensing system when the first drive signal is applied;

applying a second drive signal to the second transmit electrode;

measuring a second radiated emission from the capacitive sensing system when the second drive signal is applied;

applying a third drive signal to the third transmit electrode;

measuring a third radiated emission from the capacitive sensing system when the third drive signal is applied;

applying a fourth drive signal to the fourth transmit electrode;

measuring a fourth radiated emission from the capacitive sensing system when the fourth drive signal is applied; and controlling application of a drive signal to a transmit electrode based on the first, second, third, and fourth radiated emissions to reduce a radiated emission from the capacitive sensing system.

2. The method as in claim 1, wherein controlling application of the drive signal to the transmit electrode comprises assigning the drive signal to one of the first, second, third, and fourth transmit electrodes.

3. The method as in claim 1, wherein controlling application of the drive signal to the transmit electrode comprises ordering in time first, second, third, and fourth chips of the drive signal.

4. The method as in claim 1, wherein controlling application of the drive signal to the transmit electrode comprises inverting a polarity of the drive signal during a chip of the drive signal.

5. The method as in claim 1, wherein controlling application of the drive signal to the transmit electrode comprises:

assigning the drive signal to the transmit electrode; and ordering in time first, second, third, and fourth chips of the drive signal.

6. The method as in claim 1, wherein controlling application of the drive signal to the transmit electrode comprises:

assigning the drive signal to one of the first, second, third, and fourth transmit electrodes; and inverting a polarity of the drive signal during a chip of the drive signal.

7. The method as in claim 1, wherein controlling application of the drive signal to the transmit electrode comprises:

ordering in time first, second, third, and fourth chips of the drive signal; and inverting a polarity of the drive signal during a chip of the drive signal.

8. The method as in claim 1, wherein controlling application of the drive signal to the transmit electrode comprises:

assigning the drive signal to one of the first, second, third, and fourth transmit electrodes;

ordering in time first, second, third, and fourth chips of the drive signal; and inverting a polarity of the drive signal during a chip of the drive signal.

9. A system comprising:

a capacitive sensing system comprising first, second, third, and fourth transmit electrodes and a receive electrode positioned to have mutual capacitances between the first, second, third, and fourth transmit electrodes and the receive electrode at mutual capacitance nodes, wherein the mutual capacitance at respective ones of the mutual capacitance nodes changes when an interfering object is proximate;

a controller circuit to apply a drive signal to a transmit electrode to reduce a radiated emission from the capacitive sensing system based on: a measured radiation emission for the capacitive sensing system when a first drive signal is applied to the first transmit electrode, a measured radiation emission for the capacitive sensing system when a second drive signal is applied to the second transmit electrode, a measured radiation emission for the capacitive sensing system when a third drive signal is applied to the third transmit electrode, and a measured radiation emission for the capacitive sensing system when a fourth drive signal is applied to the fourth transmit electrode.

10. The system as in claim 9, wherein the controller circuit is to apply the drive signal to the transmit electrode to reduce a radiated emission from the capacitive sensing system by assigning the drive signal to one of the first, second, third, and fourth transmit electrodes.

11. The system as in claim 9, wherein the controller circuit is to apply the drive signal to the transmit electrode to reduce a radiated emission from the capacitive sensing system by ordering in time first, second, third, and fourth chips of the drive signal.

12. The system as in claim 9, wherein the controller circuit is to apply the drive signal to the transmit electrode to reduce a radiated emission from the capacitive sensing system by inverting a polarity of the drive signal during a chip of the drive signal.

13. The system as in claim 9, wherein the controller circuit is to apply the drive signal to the transmit electrode to reduce a radiated emission from the capacitive sensing system by:

assigning the drive signal to one of the first, second, third, and fourth transmit electrodes; and ordering in time first, second, third, and fourth chips of the drive signal.

14. The system as in claim 9, wherein the controller circuit is to apply the drive signal to the transmit electrode to reduce a radiated emission from the capacitive sensing system by:

assigning the drive signal to one of the first, second, third, and fourth transmit electrodes; and inverting a polarity of the drive signal during a chip of the drive signal.

15. The system as in claim 9, wherein the controller circuit is to apply the drive signal to the transmit electrode to reduce a radiated emission from the capacitive sensing system by:

ordering in time first, second, third, and fourth chips of the drive signal; and inverting a polarity of the drive signal during a chip of the drive signal.

16. The system as in claim 9, wherein the controller circuit is to apply the drive signal to the transmit electrode to reduce a radiated emission from the capacitive sensing system by:

assigning the drive signal to one of the first, second, third, and fourth transmit electrodes;

ordering in time first, second, third, and fourth chips of the drive signal; and inverting a polarity of the drive signal during a chip of the drive signal.

17. A system comprising:

a capacitive sensing system comprising first, second, third, and fourth transmit electrodes and a receive electrode positioned to have mutual capacitances between the first, second, third, and fourth transmit electrodes and the receive electrode at mutual capacitance nodes, wherein the mutual capacitance at respective ones of the mutual capacitance nodes changes when an interfering object is proximate;

a controller circuit to:

apply first, second, third, and fourth orthogonal drive signals to the first transmit electrode during first, second, third, and fourth chips, respectively;

apply fifth, sixth, seventh, and eighth orthogonal drive signals to the second transmit electrode during the first, second, third, and fourth, chips, respectively;

apply ninth, tenth, eleventh, and twelfth orthogonal drive signals to the third transmit electrode during the first, second, third, and fourth chips, respectively;

apply thirteenth, fourteenth, fifteenth, and sixteenth orthogonal drive signals to the fourth transmit electrode during the first, second, third, and fourth chips, respectively;

wherein the drive signals are based on: a measured radiation emission for the capacitive sensing system when a drive signal is applied to the first transmit electrode, a measured radiation emission for the capacitive sensing system when a drive signal is applied to the second transmit electrode, a measured radiation emission for the capacitive sensing system when a drive signal is applied to the third transmit electrode and a measured radiation emission for the capacitive sensing system when a drive signal is applied to the fourth transmit electrode.

18. The system as in claim 17, wherein the controller circuit is to assign the drive signals to the first, second, third, and fourth transmit electrodes during the first, second, third, and fourth chips to reduce a radiation emission of the capacitive sensing system.

19. The system as in claim 17, wherein the controller circuit is to order in time drive signals of the first, second, third, and fourth chips to reduce a radiation emission of the capacitive sensing system.

20. The system as in claim 17, wherein the controller circuit is to invert polarities of the drive signals of one of the first, second, third, or fourth chips to reduce a radiation emission of the capacitive sensing system.

* * * * *